US011770800B2

(12) United States Patent
Sarkis et al.

(10) Patent No.: US 11,770,800 B2
(45) Date of Patent: Sep. 26, 2023

(54) MULTIPLEXING INTER USER EQUIPMENT COORDINATION INFORMATION WITH SIDELINK SHARED CHANNEL

(71) Applicant: QUALCOMM Incorporated, San Diego, CA (US)

(72) Inventors: Gabi Sarkis, San Diego, CA (US); Shuanshuan Wu, San Diego, CA (US); Tien Viet Nguyen, Bridgewater, NJ (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/243,182

(22) Filed: Apr. 28, 2021

(65) Prior Publication Data
US 2021/0352626 A1 Nov. 11, 2021

Related U.S. Application Data

(60) Provisional application No. 63/020,704, filed on May 6, 2020.

(51) Int. Cl.
*H04W 72/02* (2009.01)
*H04W 72/044* (2023.01)
*H04W 72/20* (2023.01)
*H04W 80/02* (2009.01)

(52) U.S. Cl.
CPC ....... *H04W 72/02* (2013.01); *H04W 72/0473* (2013.01); *H04W 72/20* (2023.01); *H04W 80/02* (2013.01)

(58) Field of Classification Search
CPC ............ H04W 72/02; H04W 72/0406; H04W 72/0473; H04W 80/02
USPC ........................................................ 370/329
See application file for complete search history.

(56) References Cited

U.S. PATENT DOCUMENTS

| | | | |
|---|---|---|---|
| 2019/0182827 A1* | 6/2019 | Wang | H04W 72/1278 |
| 2020/0228247 A1* | 7/2020 | Guo | H04W 52/243 |
| 2021/0050979 A1* | 2/2021 | Hui | H04W 72/02 |
| 2022/0174655 A1* | 6/2022 | Tsai | H04W 4/40 |
| 2022/0191847 A1* | 6/2022 | Hong | H04W 72/044 |

FOREIGN PATENT DOCUMENTS

WO WO-2020222443 A1 * 11/2020 ........... H04L 1/0003

OTHER PUBLICATIONS 62887545P (Year: 2019).*

* cited by examiner

*Primary Examiner* — Intekhaab A Siddiquee
(74) *Attorney, Agent, or Firm* — Procopio, Cory, Hargreaves & Savitch LLP

(57) ABSTRACT

Aspects presented herein may enable a transmitting device to encode and transmit coordination information and data in separate transport blocks, such that the transmitting device may update the coordination information without altering the transport block carrying the data. In one aspect, an apparatus encodes coordination information for sidelink resources in a first transport block. The apparatus encodes data in a second transport block. The apparatus transmits a first transmission on a PSSCH, the first transmission including the first transport block comprising coordination information and the second transport block.

30 Claims, 11 Drawing Sheets

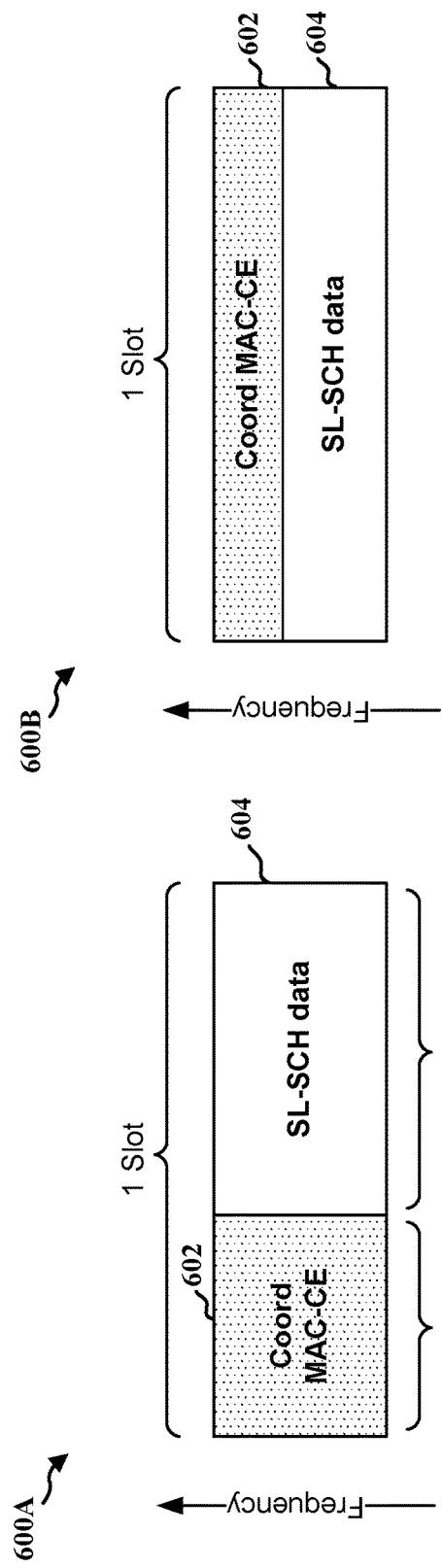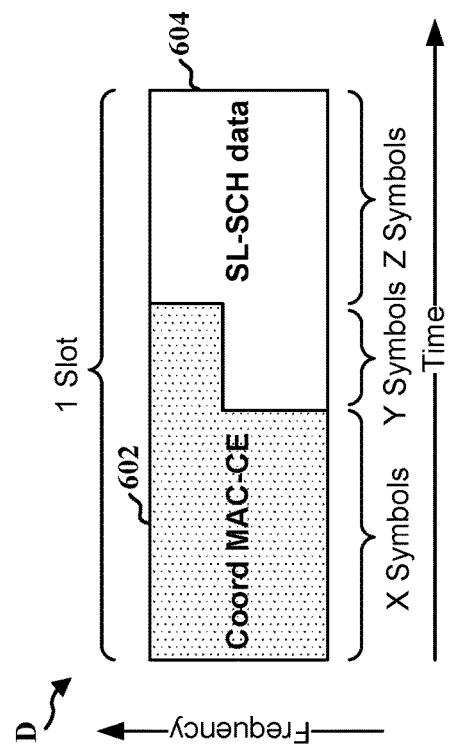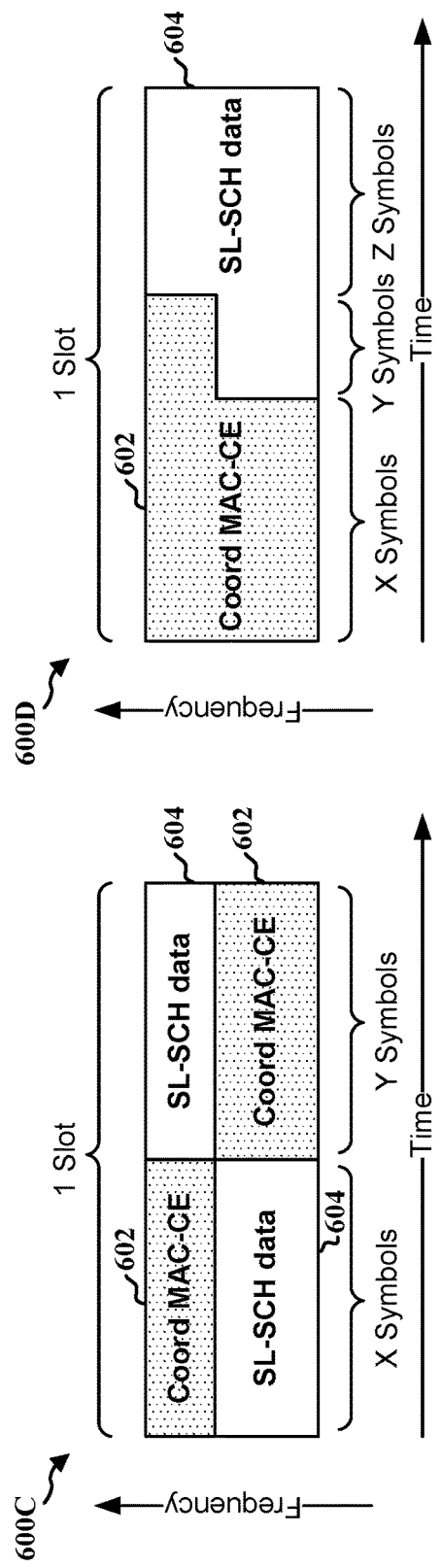

MULTIPLEXING INTER USER EQUIPMENT COORDINATION INFORMATION WITH SIDELINK SHARED CHANNEL

CROSS REFERENCE TO RELATED APPLICATION(S)

This application claims the benefit of U.S. Provisional Application Ser. No. 63/020,704, entitled "MULTIPLEXING INTER USER EQUIPMENT COORDINATION INFORMATION WITH SIDELINK SHARED CHANNEL" and filed on May 6, 2020, which is expressly incorporated by reference herein in its entirety.

BACKGROUND

Technical Field

The present disclosure relates generally to communication systems, and more particularly, to vehicle-to-vehicle (V2V), vehicle-to-everything (V2X), or other device-to-device (D2D) communication involving coordination information for side link resources.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. There exists a need for further improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a transmitting user equipment (UE). The apparatus encodes coordination information for sidelink resources in a first transport block. The apparatus encodes data in a second transport block. The apparatus transmits a first transmission on a physical sidelink shared channel (PSSCH), the first transmission including the first transport block comprising the coordination information for the sidelink resources and the second transport block comprising the data.

In an aspect of the disclosure, a method, a computer-readable medium, and an apparatus are provided for wireless communication at a receiving UE. The apparatus receives a first transmission on a PSSCH, the first transmission including a first transport block comprising coordination information for sidelink resources and a second transport block comprising data. The apparatus decodes the coordination information for sidelink resources in the first transport block. The apparatus decodes the data in the second transport block.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A, 6B, 6C and 6D are diagrams illustrating multiplexing schemes.

DETAILED DESCRIPTION

Figure 1:
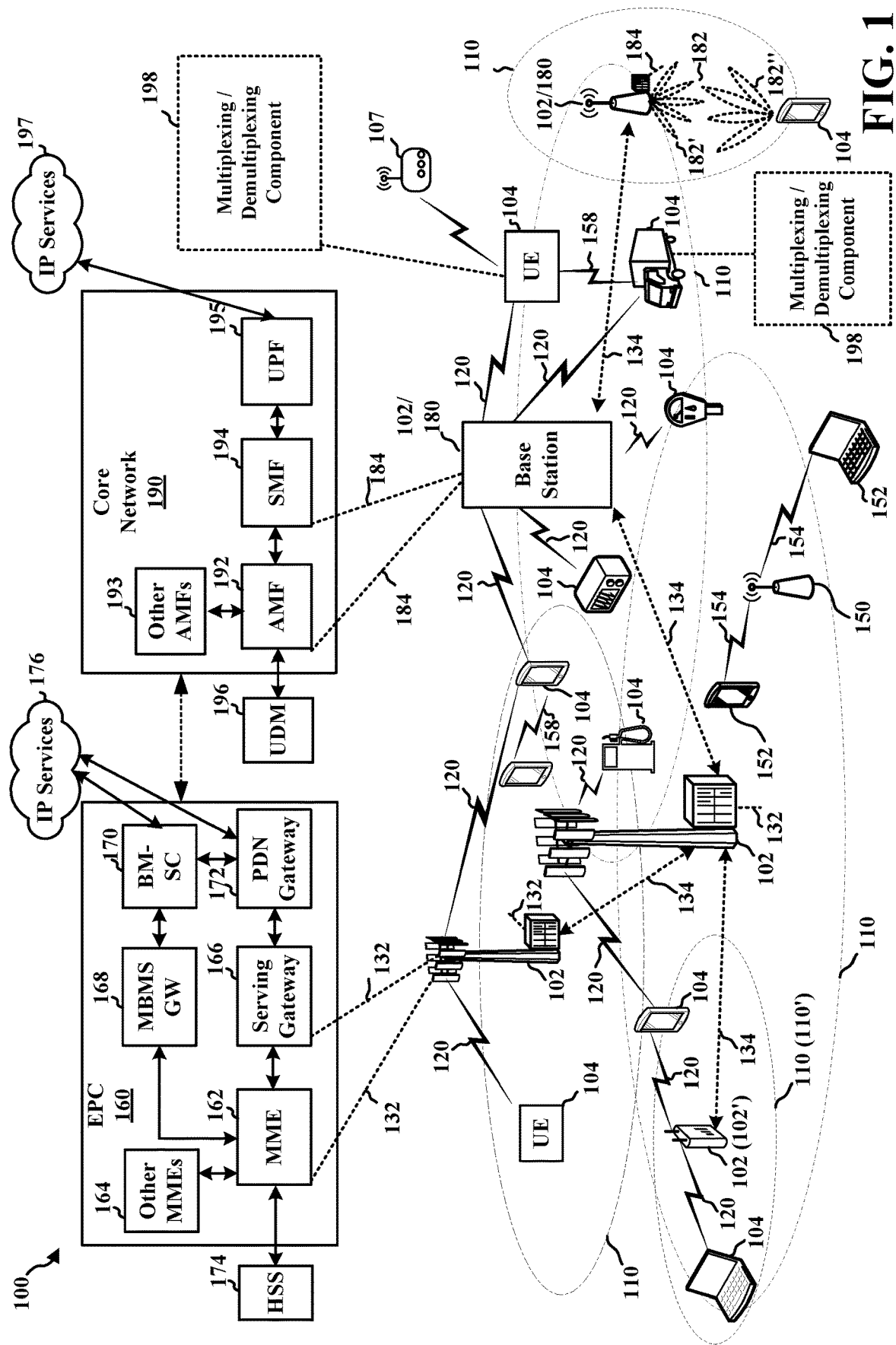
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In V2X and other D2D communication, devices may select resources for transmission. In order to coordinate the selection of resources among multiple devices, each device may indicate a resource reservation for time and frequency resources that the device intends to use for a transmission (e.g., an initial transmission and/or one or more retransmissions). For example, a UE may monitor the resource reservations that it receives from other devices and may maintain information about the reserved resources. The UE may use the reservation information to determine a candidate resource set that the UE may use to select resources for transmission. In some examples, a UE may share coordination information about observed resource reservations with another UE. The coordination information may be transmitted, e.g., in a medium access control-control element (MAC-CE).

Aspects presented herein enable coordination information for sidelink resources in the MAC-CE to be modified and kept up-to-date without affecting (e.g., altering) the content of the data TB (e.g., sidelink shared channel (SL-SCH) data) that is transmitted with the MAC-CE in a physical sidelink shared channel (PSSCH). In one aspect of the present disclosure, the MAC-CE carrying the coordination information and the SL-SCH data may be encoded into separate TBs and may be transmitted on a shared channel and in the same resource window. By transmitting the MAC-CE and the SL-SCH data in separate TBs, the content of the MAC-CE may be altered or a new MAC-CE may be used so that the coordination information within the MAC-CE may be kept up-to-date. The MAC-CE may be updated or replaced with a new MAC-CE without affecting the content of the SL-SCH data, as the SL-SCH data is transmitted in a separate TB.

FIG. 1 is a diagram illustrating an example of a wireless communications system and an access network 100. In certain aspects, the UE 104 may include a multiplexing/demultiplexing component 198 configured to multiplex MAC-CE and SL-SCH data of a transmission into separate TBs. For example, the UE 104 may apply TDM, FDM or both to the transmission to transmit the MAC-CE and the SL-SCH data in different time and/or frequency resources. The multiplexing/demultiplexing component 198 may also be configured to perform demultiplexing of the transmissions (e.g., at retransmission) to recombine the MAC-CE comprising updated coordination information with the SL-SCH data.

Referring back to FIG. 1, the wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Figure 2:
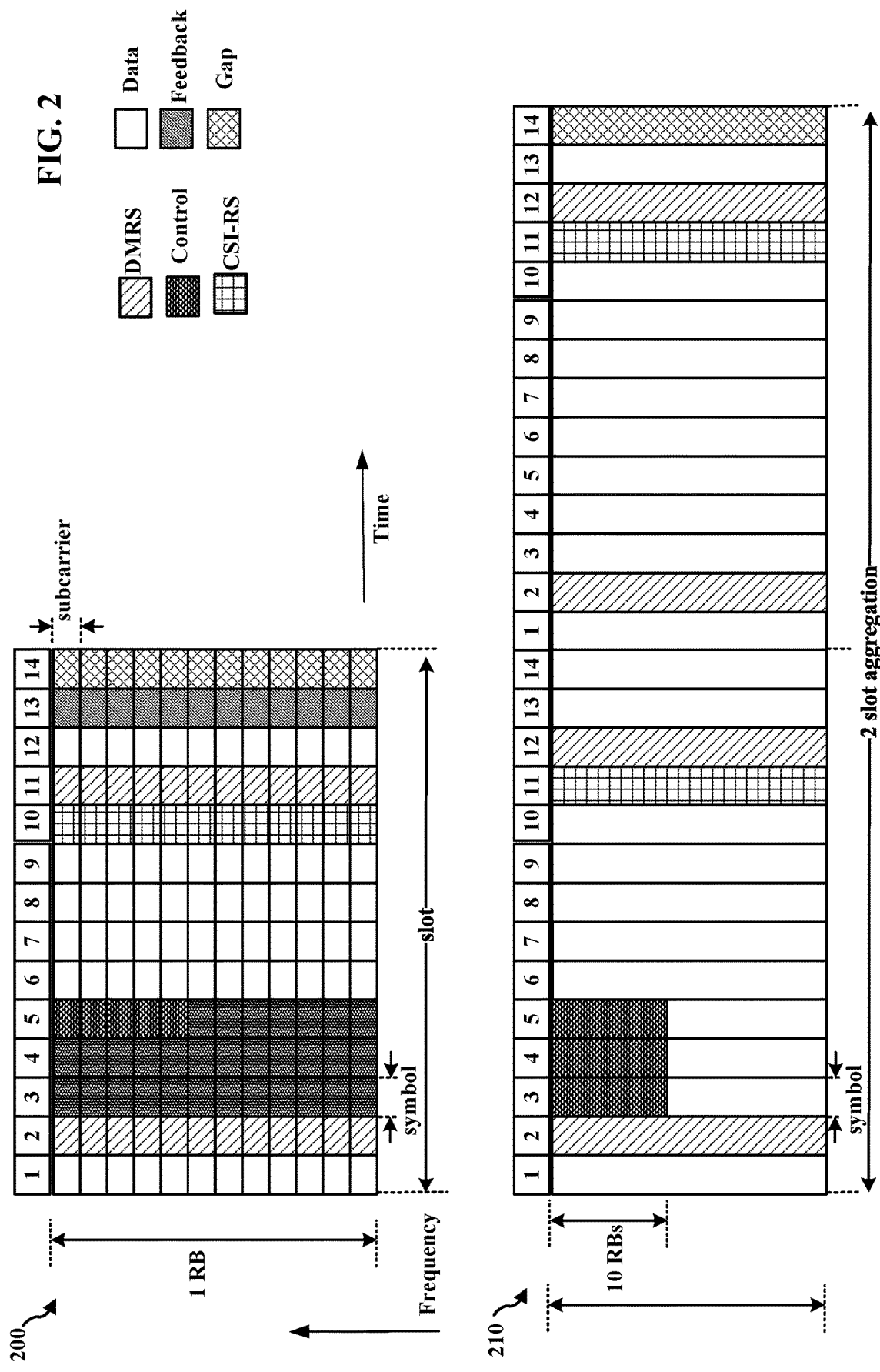
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
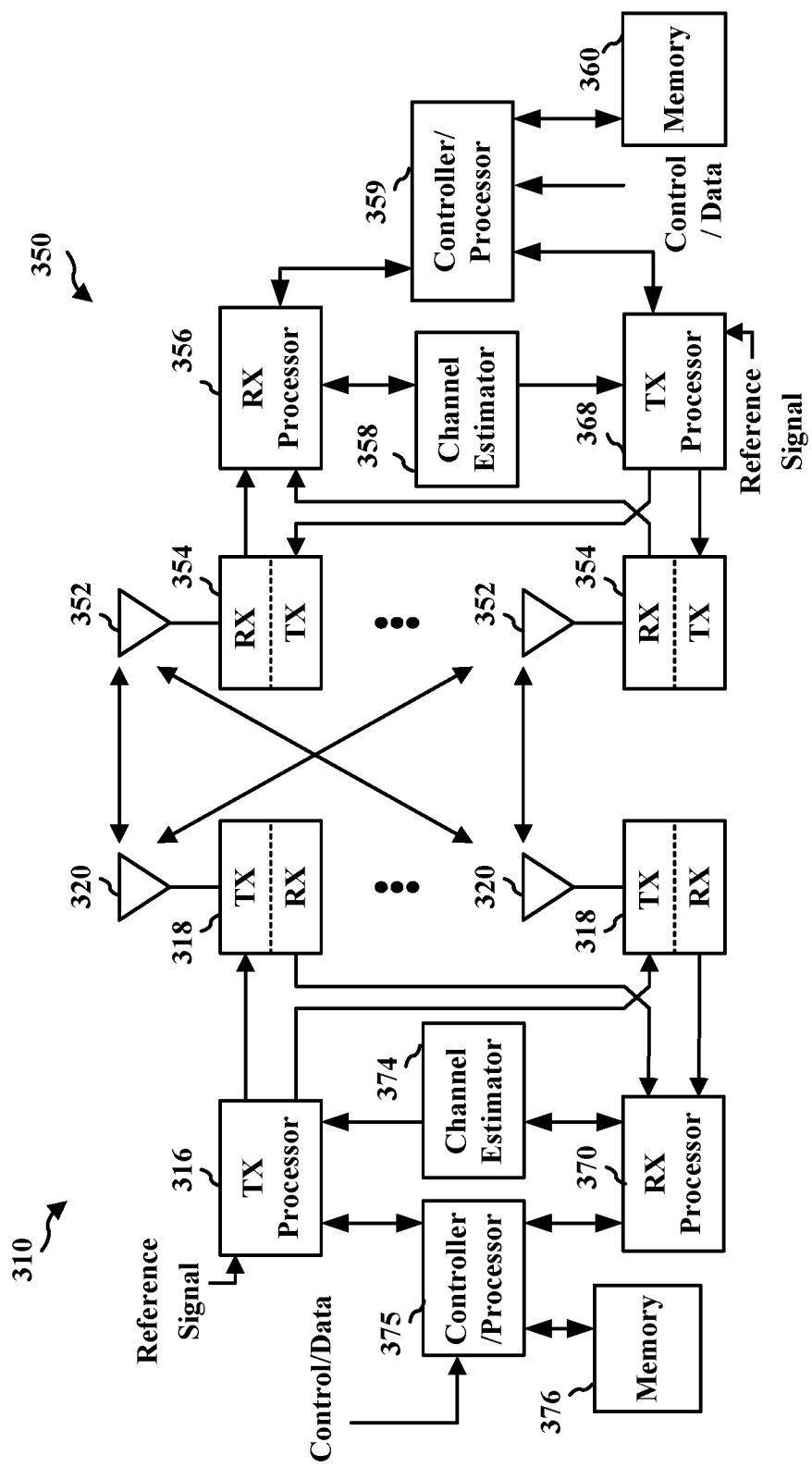
FIG. 3 is a diagram illustrating an example of a first device and a second device involved in wireless communication based, e.g., on V2V, V2X, and/or other D2D communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the multiplexing/demultiplexing component 198 of FIG. 1.

D2D communication, such as V2X, communication is growing in importance as automobile manufacturers move toward fully automated vehicles. V2X communication may utilize synchronous timing for communication where V2X users use a same reference timing. Devices communicating based on V2X, or other D2D based communication, may determine radio resource (e.g., sub-channels in the frequency domain) utilisation to avoid collisions with other devices.

In some examples, the radio resource allocation for the sidelink communication may be based on resource reservations. For instance, when a UE is preparing to transmit data on a sidelink, the UE may first determine whether one or more sidelink resources are reserved by other UE(s). Then, the UE may reserve sidelink resources that have not been reserved. For example, in one of sidelink resource allocation modes (which may be referred to as "Mode 2" or "sidelink Mode 2"), the UE may receive reservation information based on a resource reservation field comprised in the SCI(s) transmitted by other UE(s) or stations. The UE may exclude resources that are used and/or reserved by other UEs, and may select/reserve resources for a transmission from the resources that are unused. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink. In other words, under Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

Figure 4:
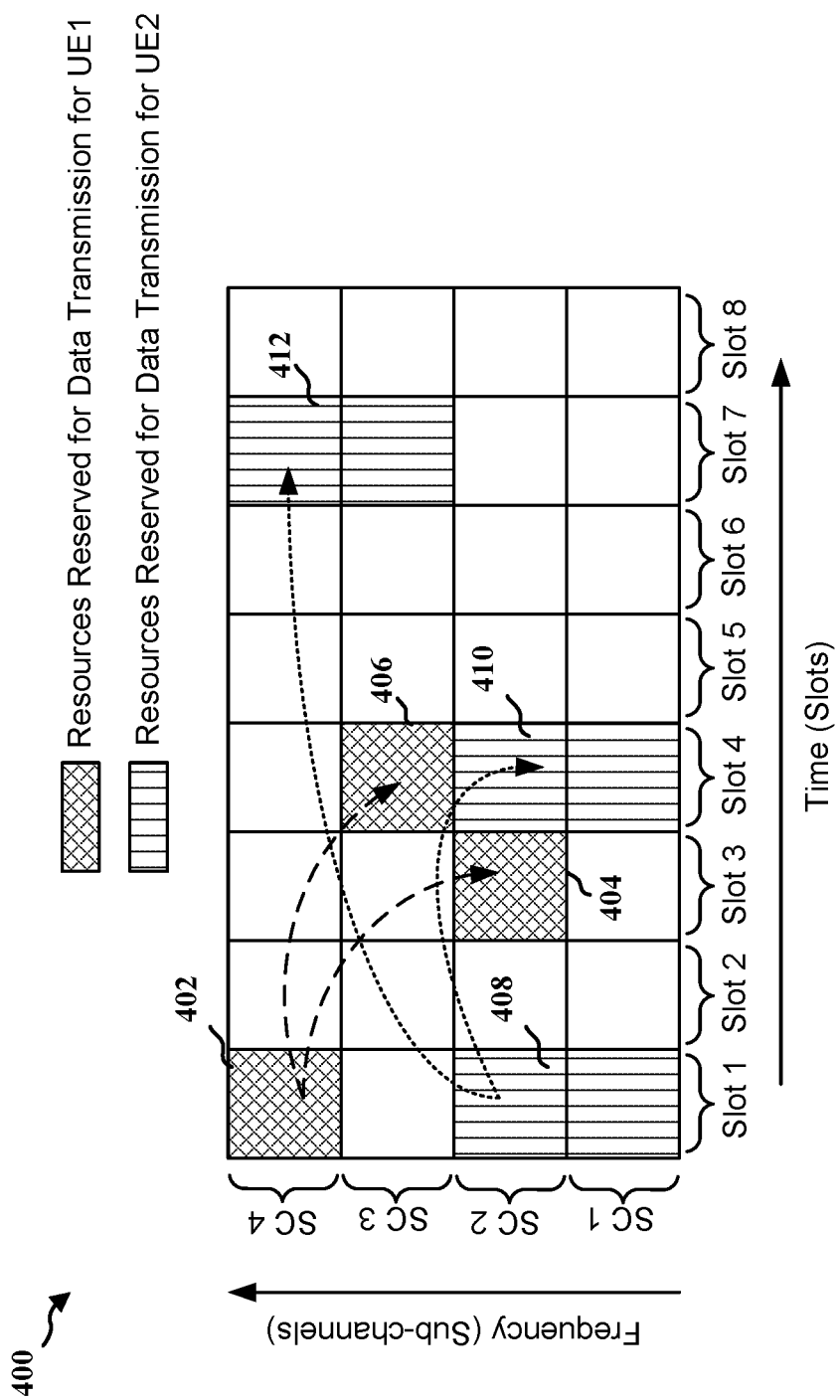
FIG. 4 is a diagram illustrating an example resource allocation and reservation.

FIG. 4 is a diagram 400 illustrating an example of time-frequency resources reservations for sidelink transmissions. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In some examples, a UE (e.g., UE1 and UE2) may reserve up to two different future slots for retransmissions. The resource reservation may be limited to a window of a defined slots and sub-channels, such as an eight (8) time slots by four (4) sub-channels window as shown in diagram 400, which may provide thirty-two (32) available resource blocks in total. This window may also be referred to as a resource selection window. Each resource block in the resource selection window may be used to transmit data (e.g., PSSCH) and/or control information (e.g., PSCCH).

In one example, a first UE ("UE1") may reserve a sub-channel (e.g., SC 4) in a current slot (e.g., slot 1) for its initial data transmission as shown at 402, and may reserve additional future slots within the window for data retransmissions (e.g., as shown at 404 and 406). For example, UE1 may reserve sub-channels SC 2 at slots 3 and SC 3 at slot 4 for future retransmissions. UE1 may then transmit information regarding which resources are being used and/or reserved by it to other UE(s), such as by including the reservation information in a reservation resource field of SCI, e.g., a first stage SCI.

Similarly, a second UE ("UE2") may also reserve resources in sub-channels SC 1 and SC 2 at time slot 1 for its current data transmission as shown at 408, and may reserve first data retransmission at time slot 4 using sub-channels SC 1 and SC 2, and reserve second data retransmission at time slot 7 using sub-channels SC 3 and SC 4 as shown at 410 and 412. UE2 may then transmit the resource usage and reservation information to other UE(s), such as using the reservation resource field in SCI.

If a third ("UE3") is configured to transmit a data based on the same resource selection window, UE3 may consider resources reserved by other UEs within the resource selection window to select available resources to transmit the data. For example, UE3 may first decode SCIS within a time period to identify which resources are available (e.g., candidate resources), and UE3 may exclude the resources that are reserved, such as resources reserved by UE1 and UE2. Then, UE3 may select available sub-channels and time slots from the candidate resources for its transmission and retransmissions, which may be based on a number of adjacent sub-channels in which the data (e.g., packet) to be transmitted can fit. While FIG. 4 illustrates resources being reserved for an initial transmission and two retransmissions, the reservation may be for more than two retransmissions, an initial transmission and a single retransmission, or only for an initial transmission, etc.

In some examples, the resource reservation may be periodic or aperiodic. If the resource reservation is periodic, the reservation period may be configured to a value between 0 ms and 1000 ms by signaling in the SCI, and the periodic resource reservation may be disabled by a configuration. Each reservation of resources may have a priority level indicated in the SCI. A higher priority reservation may pre-empt a lower priority reservation.

In some instances, multiple UEs may transmit at the same time and may not receive communications (e.g., SCI) that are overlapped from each other and/or from a base station. Thus, a UE on a sidelink may miss or may be unaware of transmissions and reservations made by other UEs. For example, referring back to FIG. 4, UE1 and UE2 may transmit at the same time using resources shown at 402 and 408 respectively, and may be unaware of their respective reservations, as they may not be receiving communication from each other while transmitting. Therefore, UE1 and UE2 may reserve a same resource block for future transmission, which may result in resource collisions.

Figure 5:
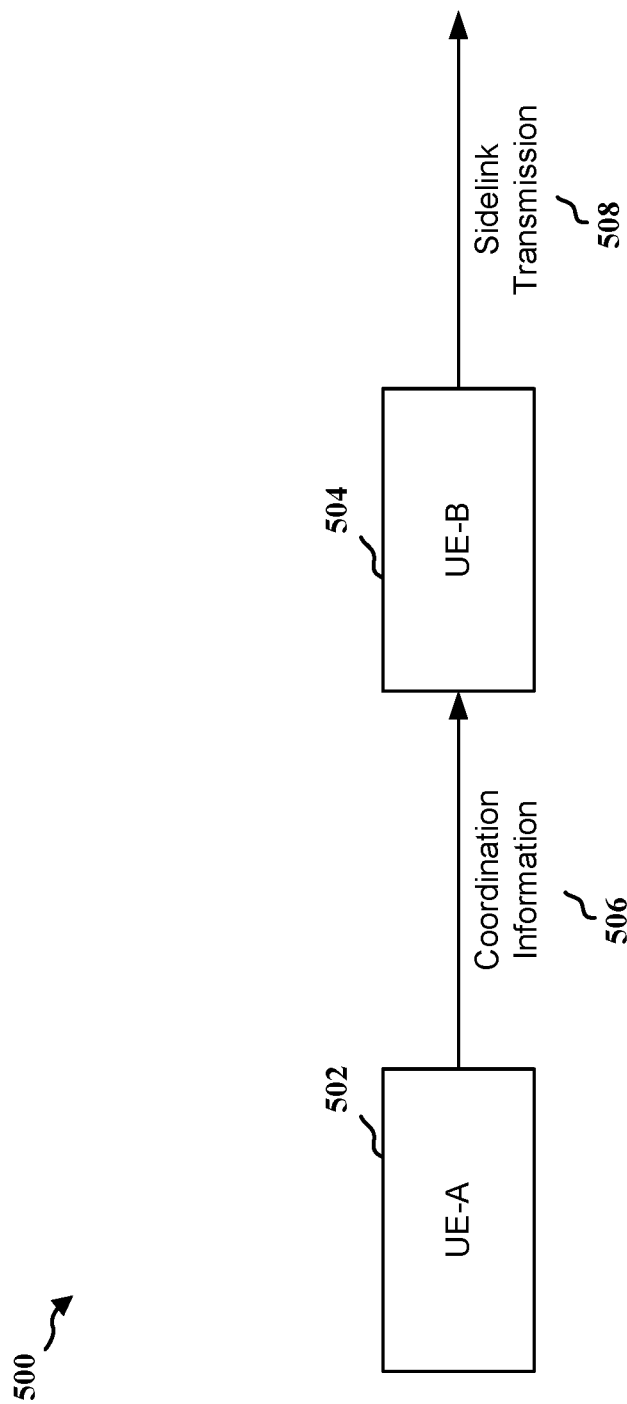
FIG. 5 is a diagram illustrating a transmitting device sending coordination information.

To reduce or avoid resource collisions, UEs may coordinate among themselves by generating and sharing their coordination information with other UEs, which may be referred to as an inter-UE coordination. FIG. 5 is a diagram 500 illustrating an example of an inter-UE coordination, where a first UE ("UE-A") 502 may send a coordination information 506 to a second UE ("UE-B") 504, where the coordination information 506 may include the first UE 502's own transmission and reservation, the first UE 502's sensing information (e.g., resource reservations of other UEs sensed by the first UE 502), resources that are bad or undesirable around the UE (e.g., resources subject to high interference), and/or resources which are better than other resources, etc. For example, the first UE 502 may use the coordination information 506 to inform the second UE 504 about which sub-channels and slots may be used by the second UE 504 for communicating with the first UE 502, and/or which sub-channels and slots may not be used by the second UE 504 because they may be occupied or reserved by the first UE 502 and/or other UEs, etc. Based at least in part on the coordination information 506 received from the first UE 502, the second UE 504 may be able to make a more informed decision on which resources may be used and/or reserved for its sidelink transmission(s) 508 to avoid resource collisions. In some examples, the first UE 502 may share its coordination information 506 with multiple UEs, and the second UE 504 may receive multiple coordination information 506 from multiple UEs. In other examples, the first UE 502 may transmit the coordination information 506 using a medium access control-control element (MAC-CE) on physical sidelink shared channel (PSSCH).

To increase or maximize the efficiency of an inter-UE coordination, a UE may update and transmit its coordination information frequently to keep the coordination information up-to-date. In some examples, coordination information that is older or not up-to-date (e.g., coordination information received from 100 ms, 50 ms, etc., ago) may become less useful and practical compared to coordination information that is newer or up-to-date (e.g., coordination information received from 15 ms, 3 ms, etc., ago). For example, for an aperiodic resource reservation over a sidelink, a maximum gap between retransmissions may be thirty-two (32) slots, which may be as short as sixteen (16) ms. Thus, a coordination information carrying information related to future resource reservations (e.g., by the transmitting UE or other UEs) that is older than sixteen ms may not get mapped to a reservation window. In some examples, for data retransmissions on a sidelink-shared channel (SL-SCH), if retransmissions are configured with HARQ feedbacks, a transport block (TB) scheduled for retransmission may not be altered for the retransmissions (but different redundancy version (RV) of the TB may be used). In other words, the TB within the SL-SCH may be the same between retransmissions when HARQ feedback is enabled. In some examples, a retransmission configured with a HARQ feedback may take longer than 16 ms as the retransmission may be associated with a packet delay budget that is 50 ms, 100 ms, or longer. Thus, if a TB carrying the coordination information is also configured for retransmission with HARQ feedback, the coordination information in the retransmitted TB may not be updated or kept up-to-date as the retransmitted TB may not be altered. Thus, the coordination information carried in the TB may become outdated when received by a receiving UE, and may not be accurate or useful to the receiving UE.

Aspects presented herein may enable coordination information from a transmitting UE to be kept up-to-date without affecting (e.g., altering) the content of the TBs transmitted in SL-SCH, including the retransmitted TBs. Aspects presented herein may enable a UE to balance between resource allocation and collision avoidance in a more efficient manner. In one aspect of the present disclosure, a transmitting UE may encode a MAC-CE carrying coordination information and a SL-SCH data into separate TBs, and then the transmitting UE may transmit the MAC-CE and the SL-SCH data in a same shared channel and/or in a same resources window. By transmitting the MAC-CE and the SL-SCH data in separate TBs, the content of the MAC-CE may be updated, or a new MAC-CE may be used. As such, the coordination information within the MAC-CE may be updated or kept up-to-date without affecting the content of the SL-SCH data because the SL-SCH data is transmitted in a separate TB. Then, TBs that are configured for retransmitting the SL-SCH data may be combined (e.g., through demultiplexing and multiplexing) with an updated MAC-CE TB or the new MAC-CE TB during retransmission which may result in better decoding performance.

For purposes of the present disclosure, a TB carrying a MAC-CE including the coordination information may be referred to as a "MAC-CE TB" or a "coordination MAC-CE," and a TB carrying a SL-SCH data may be referred to as a "SL-SCH data TB." In some examples, the MAC-CE TB and the SL-SCH data TB may occupy different resources within a same time slot in a resource window, and may be separated (e.g., multiplexed) based on OFDM symbols (e.g., timing division multiplexing (TDM)), based on physical resource blocks (e.g., frequency division multiplexing (FDM)), or based on a combination of both. For example, the MAC-CE TB may be mapped to a first set of physical resource blocks (PRBs) in a first set of OFDM resources and to a second set of PRBs in a second set of OFDM symbols, and the SL-SCH data TB may be mapped to a second set of PRBs in the first set of OFDM symbols and to the first set of PRBs in the second set of OFDM symbols, etc.

FIGS. 6A, 6B, 6C and 6D are diagrams 600A, 600B, 600C and 600D illustrating examples of separating the MAC-CE TB and the SL-SCH data TB based on different multiplexing schemes according to aspects of the present disclosure. As a UE may transmit the SL-SCH data in a separate TB, the UE may update the coordination information within the MAC-CE or use a new MAC-CE to keep the coordination information up-to-date without affecting the content of the SL-SCH data TB.

FIG. 6A is a diagram 600A illustrating an example of transmitting a MAC-CE TB 602 and a SL-SCH data TB 604 using different time resources (e.g., different OFDM symbols) based on TDM. For example, based on TDM, the MAC-CE TB 602 may occupy a first set of symbols within a slot, and the SL-SCH data TB 604 may occupy a second set of symbols in the same slot (e.g., symbols that do not overlap with symbols in the first set of symbols). As such, both sets of symbols may be transmitted by a UE using same frequency resources, e.g., using a same frequency band. By transmitting the MAC-CE TB 602 and the SL-SCH data TB 604 based on TDM, better frequency diversity may be achieved while time diversity may be limited.

FIG. 6B is a diagram 600B illustrating an example of transmitting the MAC-CE TB 602 and the SL-SCH data TB 604 using different frequency resources (e.g., different PRBs) based on FDM. For example, the MAC-CE TB 602 may occupy a first portion of frequency resources within a slot, and the SL-SCH data TB 604 may occupy a second portion of frequency resources within the same slot (e.g., portions that do not overlap with frequency resources in the first portion of frequency resources). As such, the MAC-CE TB 602 and the SL-SCH data TB 604 may be transmitted by a UE at the same time or at overlapping times. By transmitting the MAC-CE TB 602 and the SL-SCH data TB 604 based on FDM example, better time diversity may be achieved while frequency diversity may be limited.

FIGS. 6C and 6D are diagrams 600C and 600D illustrating examples of transmitting the MAC-CE TB 602 and the SL-SCH data TB 604 based on both TDM and FDM, which may be achieved based on frequency hopping. In one example, as shown by diagram 600C, the MAC-CE TB 602 may occupy a first set of frequency resources for X symbols, and the SL-SCH data TB 604 may occupy a second set of frequency resources for the same X symbols (or for one or more overlapping symbols). In a second set of symbols, e.g., after the X symbols, the MAC-CE TB 602 may occupy a third set of frequency resources for Y symbols, and the SL-SCH data TB 604 may occupy a fourth set of frequency resources (e.g., the other frequency resources not used by the MAC-CE TB 602 for the same Y symbols). The total number of X symbols plus Y symbols may be within or equal to one slot (e.g., 7 or 14 symbols per slot, etc.). In another example, as shown by diagram 600D, the MAC-CE TB 602 may occupy all frequency resources for X symbols and a portion of frequency resources for Y symbols, and the SL-SCH data TB 604 may occupy another portion of frequency resources for the same Y symbols (or for one or more overlapping symbols) and all frequency resources for Z symbols. The total number of X symbols plus Y symbols plus Z symbols may be within or equal to one slot (e.g., 7 or 14 symbols per slot, etc.). By transmitting the MAC-CE TB 602 and the SL-SCH data TB 604 based on both TDM and FDM, both time diversity and frequency diversity may be achieved within a transmission, which may enhance the efficiency and/or the quality of the transmission.

In another aspect of the present disclosure, the MAC-CE carrying coordination information and the SL-SCH data may be encoded into separate TBs and each TB may be transmitted on a separate layer, where each TB may occupy and use resources (e.g., time and frequency resources) on its associated layer(s). For example, the layer for the MAC-CE TB and the layer for the SL-SCH data TB may be on orthogonal antenna ports (e.g., their layers are orthogonal in space). Thus, the coordination information within the MAC-CE TB may be modified and kept up-to-date without affecting the content of the SL-SCH data TB as the SL-SCH data is being transmitted in a separate TB and on a separate layer.

In some examples, a receiving UE may be able to decode a SL-SCH data in one layer but may be unaware of the existence of other layer(s) (e.g., the layer in which the MAC-CE is transmitted). In such examples, a transmitting UE may transmit the layer carrying the MAC-CE TB at a lower power, e.g., the antenna port for transmitting the MAC-CE TB may get reduced in power relative to the antenna port for transmitting the SL-SCH data TB. In one example, the transmitting UE may transmit the MAC-CE TB based on a lower code rate than the code rate used for transmitting the SL-SCH data TB. In another examples, the transmitting UE may transmit the layer carrying the MAC-CE TB at a lower spectral efficiency. In another example, the transmitting UE may include additional signaling(s) (e.g., a bit indication) in SCI to indicate to a receiving UE about the presence of the other layer (e.g., a second layer or the layer carrying MAC-CE TB) and/or the presence of the coordination information. For example, the transmitting UE may use reserved information bits in SCI format 1 ("SCI-1") and/or SCI format 2 ("SCI-2") for the additional signaling. The additional signaling(s) may be a different signaling from a layer indication signaling that may already exist in the SCI.

In another aspect of the present disclosure, the MAC-CE TB carrying coordination information may be transmitted with the SL-SCH data TB based on non-orthogonal multiplexing scheme(s). For example, non-orthogonal multiple access (NOMA) may be used to encode the MAC-CE TB and the SL-SCH data TB. For NOMA, multiple users may utilize non-orthogonal resources concurrently (e.g., a time slot, subcarrier, spreading code, or space, etc.). Thus, a transmitting UE may transmit the MAC-CE TB and the SL-SCH data TB using non-orthogonal resources concurrently. For example, based on NOMA, spreading code and/or power-domain multiplexing schemes may be used to multiplex the MAC-CE TB and the SL-SCH data TB for transmission. Thus, the coordination information within the MAC-CE TB may be modified and kept up-to-date without affecting the content of the SL-SCH data TB as the SL-SCH data is being transmitted in a separate TB using different resources or different portion of the resources.

In another aspect of the present disclosure, a multi-user superposition transmission (MUST) type design may be used for transmitting the MAC-CE TB and the SL-SCH data TB. For example, a transmitting UE may apply a multi-TB superposition scheme for transmitting the MAC-CE TB and the SL-SCH data TB by using a superposition coding, where the transmitting UE may transmit two communications simultaneously by encoding them into a single signal in two layers. Then, a receiver (e.g., a receiving UE) with better signal reception may recover communications on both layers while a receiver with worse signal reception may recover one of the two communications on the coarse layer of the signal and ignore the one on the fine layer. For example, by using MUST, the transmitting UE may encode the SL-SCH data TB using a first or a normal constellation, and the transmitting UE may superimpose and encode the MAC-CE TB using a second constellation. Then, the transmitting UE may transmit both of the MAC-CE TB and the SL-SCH data TB simultaneously. On the receiver side, a receiver may decode the SL-SCH data TB without decoding the MAC-CE TB. For example, a UE receiving the SL-SCH data TB may view the MAC-CE TB as noise, and may choose to ignore the MAC-CE TB without decoding it. If the UE is configured to receive the MAC-CE TB, such as to obtain the coordination information, the UE may cancel out the SL-SCH data TB from the received signal and decode the MAC-CE TB in the received signal instead. As such, the coordination information within the MAC-CE TB may be modified and kept up-to-date without affecting the content of the SL-SCH data TB as they are being encoded using different constellation.

Figure 7:
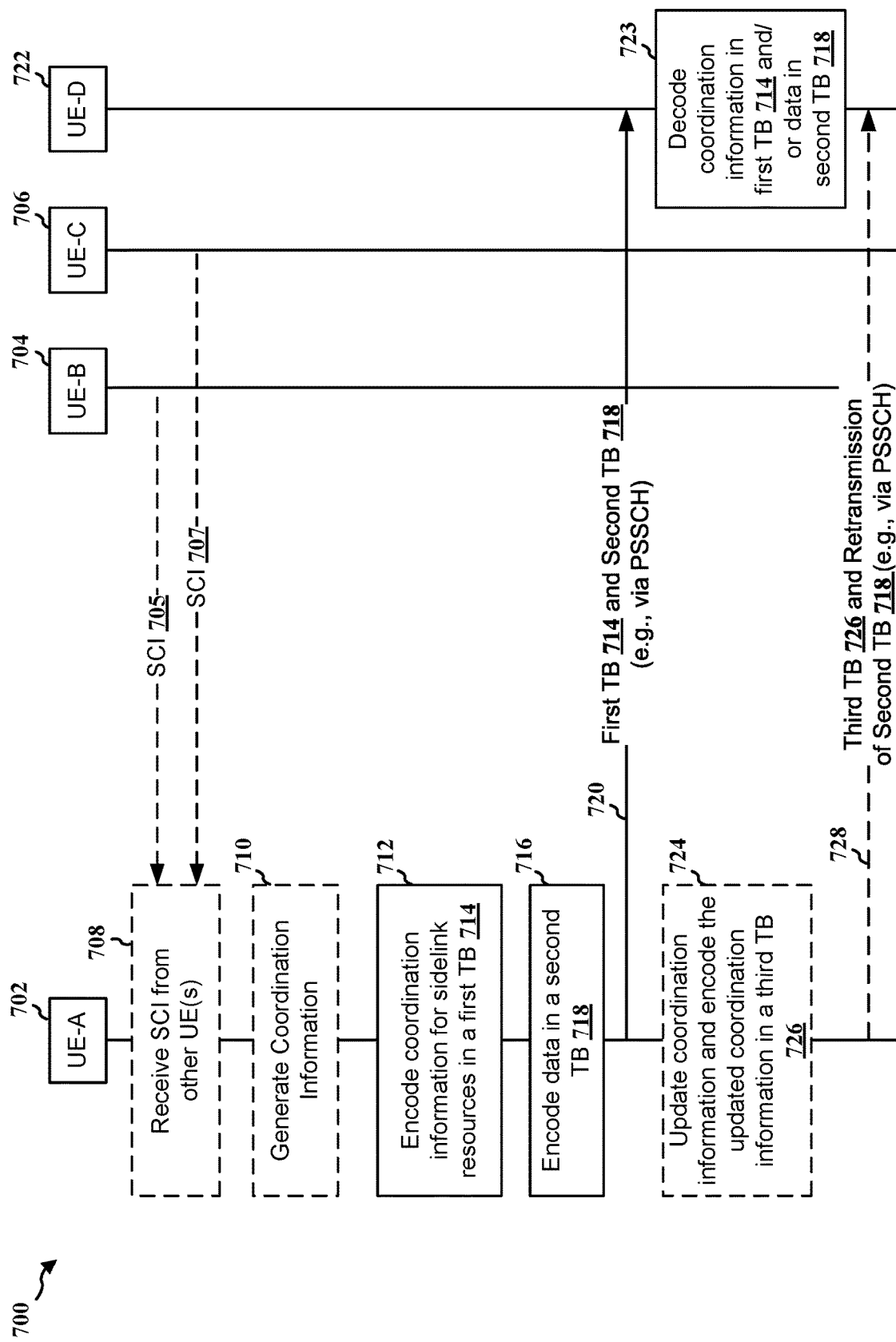
FIG. 7 is an example communication flow between a transmitting device and a receiving device.

FIG. 7 illustrates an example communication flow 700 between a transmitting device (e.g., UE 104, 502) and a receiving device (e.g., UE 104, 504) according to aspects of the present disclosure. The communication may be based on V2X, V2V, or other D2D based communication involving a direct transmission from a transmitting device to a receiving device. In some examples, the communication transmitted from the transmitting device may be broadcasted and received by multiple receiving devices within a range of the transmitting device. In other examples, the receiving device may receive communication from multiple transmitting devices.

At 708, a transmitting device 702 (e.g., a UE, a sidelink device, etc.) may receive SCIs from one or more UEs, where the SCIs may include resource reservation and sidelink scheduling information of the one or more UEs and other UEs. For example, the transmitting device 702 may receive a SCI 705 from a second UE 704, where the SCI 705 may include resource reservation information for the second UE 704 and optionally other UEs if available. Similarly, the transmitting device 702 may also receive another SCI 707 from a third UE 706, where the SCI 707 may include resource reservation information for the UE 706 and optionally other UEs, etc.

At 710, after receiving SCIs (e.g., 705, 707) from the one or more UEs (e.g., 704, 706), the transmitting device 702 may decode the SCIs received, and the transmitting device 702 may generate a coordination information based at least in part on the resource reservation and the sidelink scheduling information in the SCIs.

At 712, the transmitting device 702 may encode the generated coordination information (e.g., information related to sidelink resources) in a first TB 714. In some examples, the coordination information may include information associated with the sidelink resources reserved by one or more UEs (e.g., collected from received SCIs), information about the sidelink resources occupied by one or more UEs, a first indication of preferred sidelink resources for communication with the transmitting device 702, and/or a second indication of resources to avoid for the communication with the transmitting device, etc. In addition, the transmitting device 702 may transmit SCI indicating resource reservation information for the transmitting device 702, where the coordination information may be different from the resource reservation information. In some examples, the transmitting device 702 may transmit the coordination information in a MAC-CE.

At 716, the transmitting device 702 may encode the data of the transmission (e.g., SL-SCH data) in a second TB 718. In one example, the transmitting device 702 may separate the first TB 714 and the second TB 718 based in time (e.g., TDM), as described in connection with FIG. 6A, based in frequency (e.g., FDM), as described in connection with FIG. 6B, or based in both time and frequency, as described in connection with FIGS. 6C and 6D. Thus, the transmitting device 702 may separate the first TB and the second TB for a transmission based in time and/or based in frequency to achieve time and/or frequency diversities.

At 720, the transmitting device 702 may transmit the first TB 714 that includes the coordination information and the second TB 718 that includes the data in a transmission (e.g., a first transmission) to a receiving device 722. In some examples, the receiving device 722 may be the second UE 704 or the third UE 706.

In one aspect of the present disclosure, the transmitting device 702 may transmit the first TB 714 on a first layer and transmit the second TB 718 on a second layer. The first layer and the second layer may be transmitted using orthogonal antenna ports. In such an example, the transmitting device 702 may use a lower power to transmit the first TB 714 comprising the coordination information on the first layer than to transmit the second TB 718 comprising the data on the second layer. In another example, the transmitting device 702 may also be configured to transmit a SCI (e.g., to the receiving device 722) that indicates the presence of the first layer or the second layer.

In another aspect of the present disclosure, the transmitting device 702 may transmit the first TB 714 and the second TB 718 using non-orthogonal multiplexing. For example, the non-orthogonal multiplexing may include one or more of different spreading codes for the first TB and the second TB or power domain multiplexing. In another example, the transmitting device 702 may encode the first TB 714 using a first constellation and encode the second TB 718 using a second, different constellation.

At 723, after the receiving device 722 receives the first TB 714 and the second TB 718, the receiving device may decode the coordination information for the sidelink resources in the first TB 714, and/or the receiving device 722 may decode the data in the second TB 718.

At 724, the transmitting device 702 may update its coordination information. After the coordination information is updated, the transmitting device 702 may encode the updated coordination information and encode the updated coordination information in a third TB 726. In some examples, the coordination information may be a new coordination information that is not updated based upon the previous coordination (e.g., a new coordination information is encoded to the third TB 726).

At 728, the transmitting device 702 may transmit the third TB 726 and a retransmission of the second TB 718 in another transmission (e.g., a second transmission) on the PSSCH. Similarly, the transmitting device 702 may transmit the third TB 726 and a retransmission of the second TB 718 based on TDM, FDM, or a combination of TDM and FDM, or the transmitting device 702 may transmit the third TB 726 and a retransmission of the second TB 718 on different layers, use different transmission powers, and/or based on non-orthogonal multiplexing, etc.

As such, by encoding the coordination information for sidelink resources and the data on different TBs, the transmitting device 702 may update the coordination information without altering the data TB.

Figure 8:
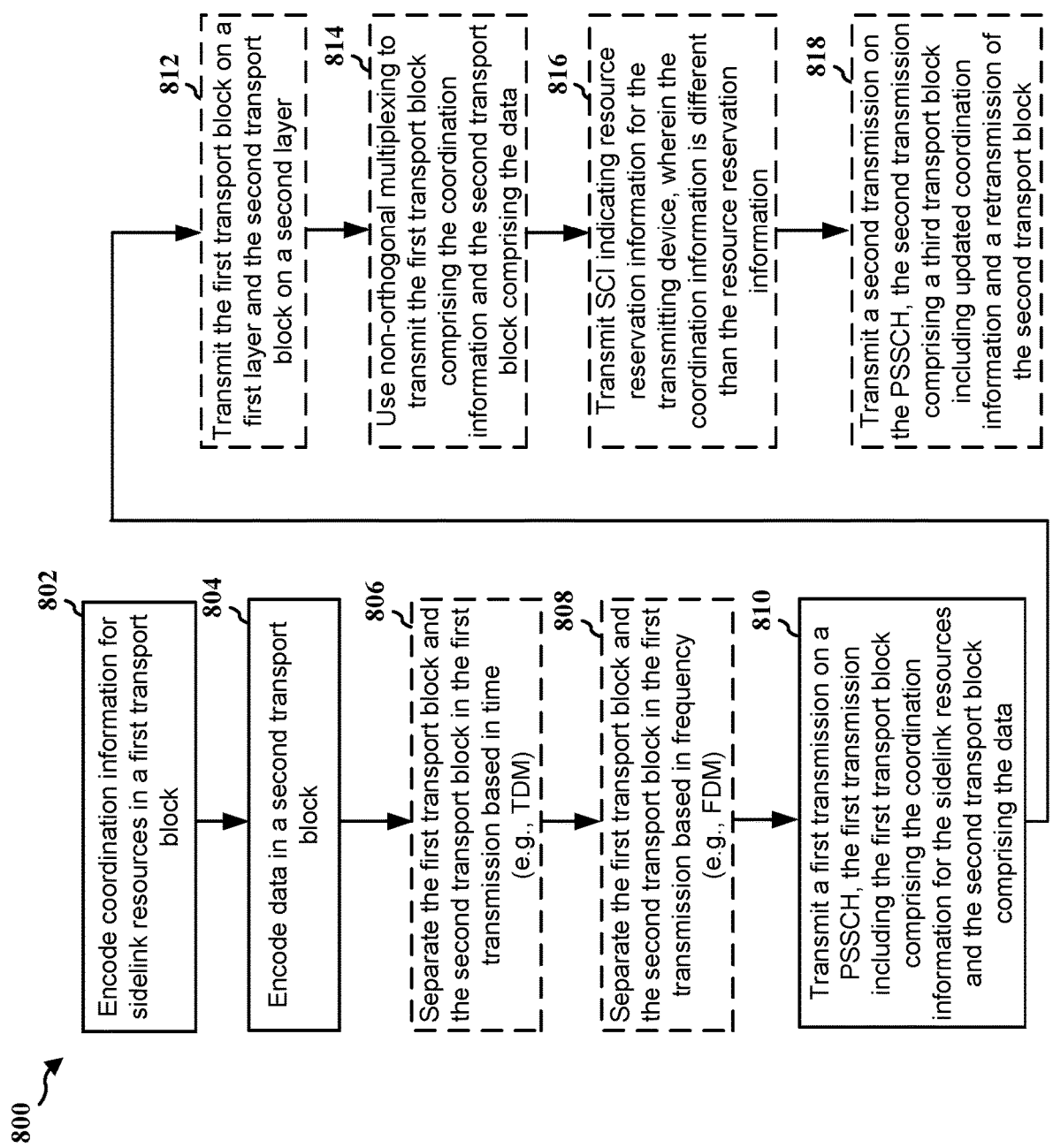
FIG. 8 is a flowchart of a method of wireless communication at a transmitting device.

FIG. 8 is a flowchart 800 of a method of wireless communication. The method may be performed by a transmitting device or a component of a transmitting device (e.g., the UE 104, 502; the transmitting device 702; an RSU 107; the apparatus 902; the device 310 or 350; a processing system, which may include the memory 360 and which may be the device 350 or a component of the device 350, such as the TX processor 368, the RX processor 356, and/or the controller/processor 359). The method may enable the transmitting device to encode and transmit coordination information and data on different TBs, such that the transmitting device may update the coordination information without modifying the TB carrying the data.

At 802, the transmitting device may encode coordination information for sidelink resources in a first transport block, such as described in connection with FIG. 7. For example, at 712, the transmitting device 702 may encode coordination information for sidelink resources in a first TB 714. The coordination information may be transmitted in a MAC-CE on PSSCH. The encoding of the coordination information may be performed, e.g., by the coordination information encode component 940 of the apparatus 902 in FIG. 9.

In one example, the coordination information may include one or more of: information about the sidelink resources reserved by one or more additional transmitting devices, information about the sidelink resources occupied by the one or more additional transmitting devices, a first indication of preferred sidelink resources for communication with the transmitting device, and/or a second indication of resources to avoid for the communication with the transmitting device, etc.

At 804, the transmitting device may encode data (e.g., SL-SCH data) in a second transport block, such as described in connection with FIG. 7. For example, at 716, the transmitting device 702 may encode data in a second TB 718. The second transport block may be configured to be retransmitted. The encoding of the data may be performed, e.g., by the data encode component 942 of the apparatus 902 in FIG. 9.

In one example, as shown at 806, the transmitting device may separate the first transport block and the second transport block in the first transmission based in time (e.g., TDM), where the first transport block and the second transport block may be transmitted on different OFDM symbols, such as described in connection with FIG. 6A. For example, after time division, the first transport block may occupy certain symbols within a slot, and the second transport block may occupy other symbols within the same slot. Both of them may use a same frequency band. The separation of the first transport block and the second transport block based in time may be performed, e.g., by the TB separation component 944 of the apparatus 902 in FIG. 9.

In another example, as shown at 808, the transmitting device may separate the first transport block and the second transport block in the first transmission based in frequency (e.g., FDM), where the first transport block and the second transport block may be transmitted on different PRBs in the first transmission, such as described in connection with FIG. 6B. For example, after FDM, the first transport block may occupy certain frequency band within a slot, and the second transport block may occupy other frequency band within the same slot. Both of them may be transmitted at the same time. The separation of the first transport block and the second transport block based in frequency may be performed, e.g., by the TB separation component 944 of the apparatus 902 in FIG. 9.

In another example, the transmitting device may separate the first transport block and the second transport block in the first transmission based both in time and frequency, such as described in connection with FIGS. 6C and 6D. For example, the first transport block may be mapped to a first set of PRBs in a first set of OFDM resources and to a second set of PRBs in a second set of OFDM symbols, and the second transport block may be mapped to a second set of PRBs in the first set of OFDM symbols and to the first set of PRBs in the second set of OFDM symbols, such as described in connection with FIG. 6C. In another example, the first transport block may occupy all frequency resources for X symbols and a portion of frequency resources for Y symbols, and the second transport block may occupy another portion of frequency resources for the same Y symbols and all frequency resources for Z symbols. The separation of the first transport block and the second transport block based in time and frequency may be performed, e.g., by the TB separation component 944 of the apparatus 902 in FIG. 9. For example, after apply TDM and FDM to the first transport block and the second transport block, the first transport block may occupy certain frequency band for X symbols, and the second transport block may occupy other frequency band for same X symbols. After X symbols, the first transport block may occupy a different frequency band for Y symbols, and the second transport block may occupy other frequency band not used by the first transport block for the same Y symbols. The total number of X symbols plus Y symbols may be within or equal to one slot (e.g., 7 or 14 symbols per slot, etc.).

At 810, the transmitting device may transmit a first transmission on a PSSCH, the first transmission may include the first transport block comprising the coordination information for the sidelink resources and the second transport block comprising the data, such as described in connection with FIG. 7. For example, at 720, the transmitting device 702 may transmit the first TB 714 including the coordination information and the second TB 718 including the data in a PSSCH to the receiving device 722. The transmission of the first transmission may be performed, e.g., by the TB transmission component 946 and/or the transmission component 934 of the apparatus 902 in FIG. 9.

In one example, as shown at 812, the transmitting device may transmit the first transport block on a first layer and the second transport block on a second layer, where the first layer and the second layer may be transmitted using orthogonal antenna ports. The transmitting device may use a lower power to transmit the first transport block comprising the coordination information on the first layer than to transmit the second transport block comprising the data on the second layer. The transmitting device may transmit SCI including an indication of a presence of the first layer. Each transport block may occupy and use resources (e.g., time and frequency) on its associated layer(s). In addition, the first transport block comprising the coordination information may be transmitted using a lower code rate than the second transport block comprising data.

In another example, as shown at 814, the transmitting device may use non-orthogonal multiplexing to transmit the first transport block comprising the coordination information and the second transport block comprising the data. The non-orthogonal multiplexing may include one or more of different spreading codes for the first transport block and the second transport block or power domain multiplexing. For example, NOMA may be used to encode the first transport block and the second transport block where spreading code and/or power-domain multiplexing schemes may be used to multiplex the first transport block and the second transport block.

In another example, the transmitting device may encode the first transport block using a first constellation and encode the second transport block using a second, different constellation. For example, MUST may be used for transmitting the first transport block and the second transport block, where the first transport block may be encoded using a first or normal constellation, and the second transport block may be superimposed and encoded using a second constellation. Then, the transmitting device may transmit the first transport block and the second transport block simultaneously.

In another example, as shown at 816, the transmitting device may transmit SCI indicating resource reservation information for the transmitting device, where the coordination information may be different than the resource reservation information.

At 818, the transmitting device may transmit a second transmission on the PSSCH, the second transmission comprising a third transport block including updated coordination information and a retransmission of the second transport block, such as described in connection with FIG. 7. For example, at 728, the transmitting device 702 may transmit a third TB 726 that includes an updated coordination information and a retransmission of the second TB 718 to the receiving device 722. For example, the transmitting device may update its coordination information and transmit the second transmission on the PSSCH comprising the third transport block (e.g., new or updated MAC-CE) that includes the updated coordination information and a retransmission of the second transport block. The transmission of the second transmission may be performed, e.g., by the TB transmission component 946 and/or the transmission component 934 of the apparatus 902 in FIG. 9.

Figure 9:
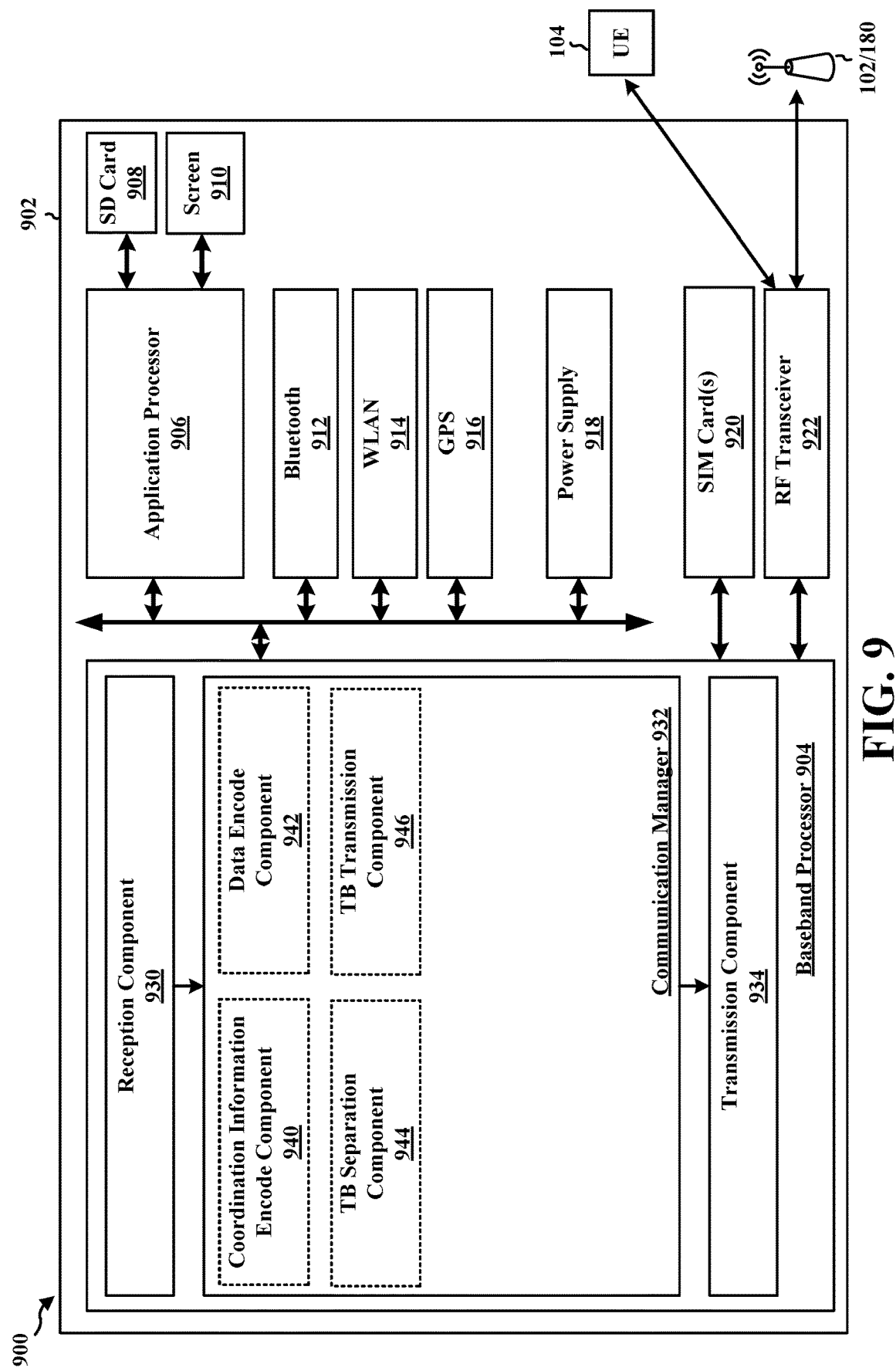
FIG. 9 is a diagram illustrating an example of a hardware implementation for an example apparatus in accordance with aspects presented herein.

FIG. 9 is a diagram 900 illustrating an example of a hardware implementation for an apparatus 902. The apparatus 902 is a UE and includes a cellular baseband processor 904 (also referred to as a modem) coupled to a RF transceiver 922 and one or more subscriber identity modules (SIM) cards 920, an application processor 906 coupled to a secure digital (SD) card 908. In some aspects, the baseband processor 904 may be a cellular baseband processor, and the RF transceiver may be a cellular RF transceiver. The apparatus may further include a screen 910, a Bluetooth module 912, a wireless local area network (WLAN) module 914, a Global Positioning System (GPS) module 916, and/or a power supply 918. The baseband processor 904 communicates through the RF transceiver 922 with the UE 104 and/or BS 102/180. The baseband processor 904 may include a computer-readable medium/memory. The computer-readable medium/memory may be non-transitory. The baseband processor 904 is responsible for general processing, including the execution of software stored on the computer-readable medium/memory. The software, when executed by the baseband processor 904, causes the baseband processor 904 to perform the various functions described herein. The computer-readable medium/memory may also be used for storing data that is manipulated by the baseband processor 904 when executing software. The baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband processor 904. The baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see UE 350 of FIG. 3) and include the additional modules of the apparatus 902.

The communication manager 932 includes a coordination information encode component 940 that is configured to encode coordination information for sidelink resources in a first transport block, e.g., as described in connection with 802 of FIG. 8. The communication manager 932 further includes a data encode component 942 that is configured to encode data (e.g., SL-SCH data) in a second transport block, e.g., as described in connection with 804 of FIG. 8. The communication manager 932 further includes a TB separation component 944 that is configured to separate the first transport block and the second transport block in the first transmission based in time, based in frequency, or based in both time and frequency, e.g., as described in connection with 806 and 808 of FIG. 8. The communication manager 932 further includes a TB transmission component 946 that is configured to transmit a first transmission on a PSSCH, the first transmission including the first transport block comprising the coordination information for the sidelink resources and the second transport block comprising the data, e.g., as described in connection with 810 of FIG. 8.

The apparatus may include additional components that perform each of the blocks of the algorithm in the aforementioned flowchart of FIG. 8. As such, each block in the flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband processor 904, includes means for encoding coordination information for sidelink resources in a first transport block (e.g., the coordination information encode component 940). The apparatus 902 includes means for encoding data in a second transport block (e.g., the data encode component 942). The apparatus 902 includes means for separating the first transport block and the second transport block in the first transmission based in time, frequency or both time and frequency (e.g., the TB separation component 944). The apparatus 902 includes means for transmitting a first transmission on a physical sidelink shared channel (PSSCH), the first transmission including the first transport block comprising the coordination information for the sidelink resources and the second transport block comprising the data (e.g., the TB transmission component 946 and/or the transmission component 934).

The aforementioned means may be one or more of the components of the apparatus 902 configured to perform the functions recited by the aforementioned means. The apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
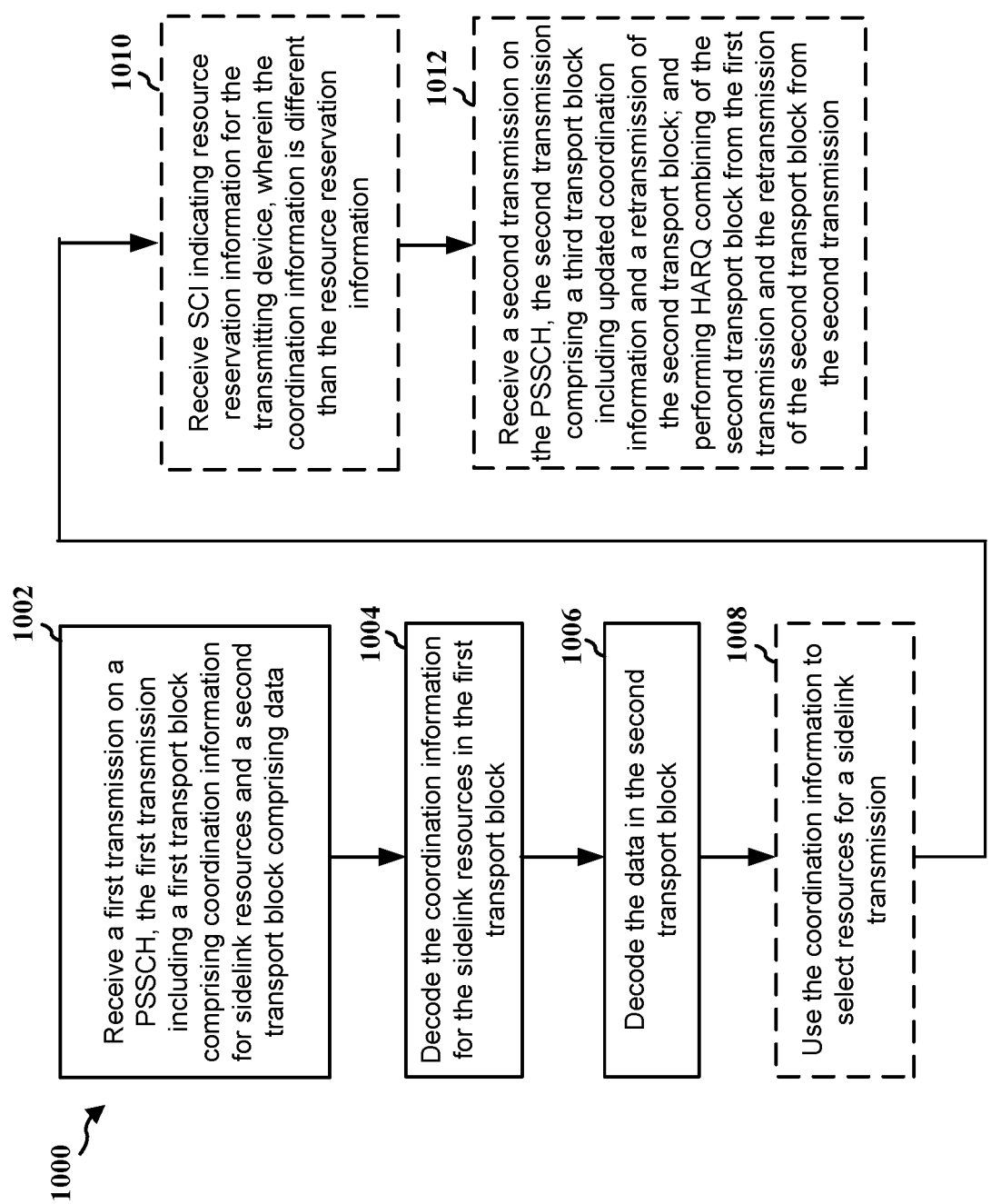
FIG. 10 is a flowchart of a method of wireless communication at a receiving device.

FIG. 10 is a flowchart 1000 of a method of wireless communication. The method may be performed by a receiving device or a component of a receiving device (e.g., a UE 104, 504; the receiving device 704; an RSU 107; the device 310 or 350; the apparatus 1102; a processing system, which may include the memory 360 and which may be the device 350 or a component of the device 350, such as the TX processor 368, the RX processor 356, and/or the controller/processor 359). The method may enable the receiving device to receive coordination information and data in separate TBs.

At 1002, the receiving device may receive a first transmission on a PSSCH, the first transmission may include a first transport block comprising coordination information for sidelink resources and a second transport block comprising data, such as described in connection with FIG. 7. For example, at 720, the receiving device 722 may receive the first TB 714 including coordination information and the second TB 718 including the data. In one example, the receiving device may receive the coordination information in a MAC-CE on the PSSCH. The reception of the first transmission may be performed, e.g., by the coordination information and data process component 1140 and/or the reception component 1130 of the apparatus 1102 in FIG. 11.

In one example, the first transport block and the second transport block received by the receiving device from the first transmission may have been multiplexed or separated using time division, frequency division or a combination of both, such as described in connection with FIGS. 6A, 6B, 6C and 6D. For example, if time division is applied, the receiving device may receive the first transport block and the second transport block on different OFDM symbols. If frequency division is applied, the receiving device may receive the first transport block and the second transport block on different PRBs. If both time and frequency divisions are applied, the receiving device may receive the first transport block in a first set of PRBs in a first set of OFDM resources and a second set of PRBs in a second set of OFDM symbols, and the receiving device may also receive the second transport block in a second set of PRBs in the first set of OFDM symbols and in the first set of PRBs in the second set of OFDM symbols.

In another example, the receiving device may receive the first transport block on a first layer and the second transport block on a second layer, where the first layer and the second layer may have orthogonal antenna ports. The first transport block comprising the coordination information on the first layer may be received by the receiving device with a lower transmission power than the second transport block comprising the data on the second layer. The receiving device may also receive a SCI including an indication of a presence of the first layer. In addition, the first transport block comprising coordination information may be received using a lower code rate than the second transport block.

At 1004, the receiving device may decode the coordination information for the sidelink resources in the first transport block, such as described in connection with FIG. 7. For example, at 726, after the receiving device 722 receives the first TB 714, the receiving device may decode the coordination information for the sidelink resources in the first TB 714. The decoding of the coordination information may be performed, e.g., by the coordination information decode component 1142 of the apparatus 1102 in FIG. 11. In one example, the receiving device may use the coordination information to select resources for a sidelink transmission.

At 1006, the receiving device may decode the data in the second transport block, such as described in connection with FIG. 7. For example, at 726, after the receiving device 722 receives the second TB 718, the receiving device may decode the data in the second TB 718. The decoding of the data may be performed, e.g., by the data decode component 1144 of the apparatus 1102 in FIG. 11. In some examples, the data may be retransmissions.

In one example, the first transport block including the coordination information may be non-orthogonally multiplexed with the second transport block comprising the data. The non-orthogonal multiplexing may include one or more of different spreading codes for the first transport block and the second transport block or power domain multiplexing. Thus, to retrieve the coordination information, the receiving device may cancel the second transport block from the first transmission to decode the coordination information in the first transport block.

In another example, the first transport block may be encoded using a first constellation and the second transport block may be encoded using a second, different constellation. To retrieve the coordination information in the first transport block, the receiving device may cancel the second transport block from the first transmission using the second constellation to decode the coordination information in the first transport block using the first constellation.

At 1008, after receiving and decoding the coordination information, the receiving device may use the coordination information to select resources for a sidelink transmission, such as described in connection with FIG. 5.

At 1010, the receiving device may receive SCI indicating resource reservation information for the transmitting device, where the coordination information may be different than the resource reservation information. In one example, the coordination information received by the receiving device may include one or more of: information about the sidelink resources reserved by one or more additional transmitting devices, information about the sidelink resources occupied by the one or more additional transmitting devices, a first indication of preferred sidelink resources for communication with the transmitting device, or a second indication of resources to avoid for the communication with the transmitting device.

At 1012, the receiving device may receive a second transmission on the PSSCH, the second transmission may include a third transport block including updated coordination information and a retransmission of the second transport block. The receiving device may also perform HARQ feedback combining of the second transport block from the first transmission and the retransmission of the second transport block from the second transmission, such as described in connection at 728 of FIG. 7.

Figure 11:
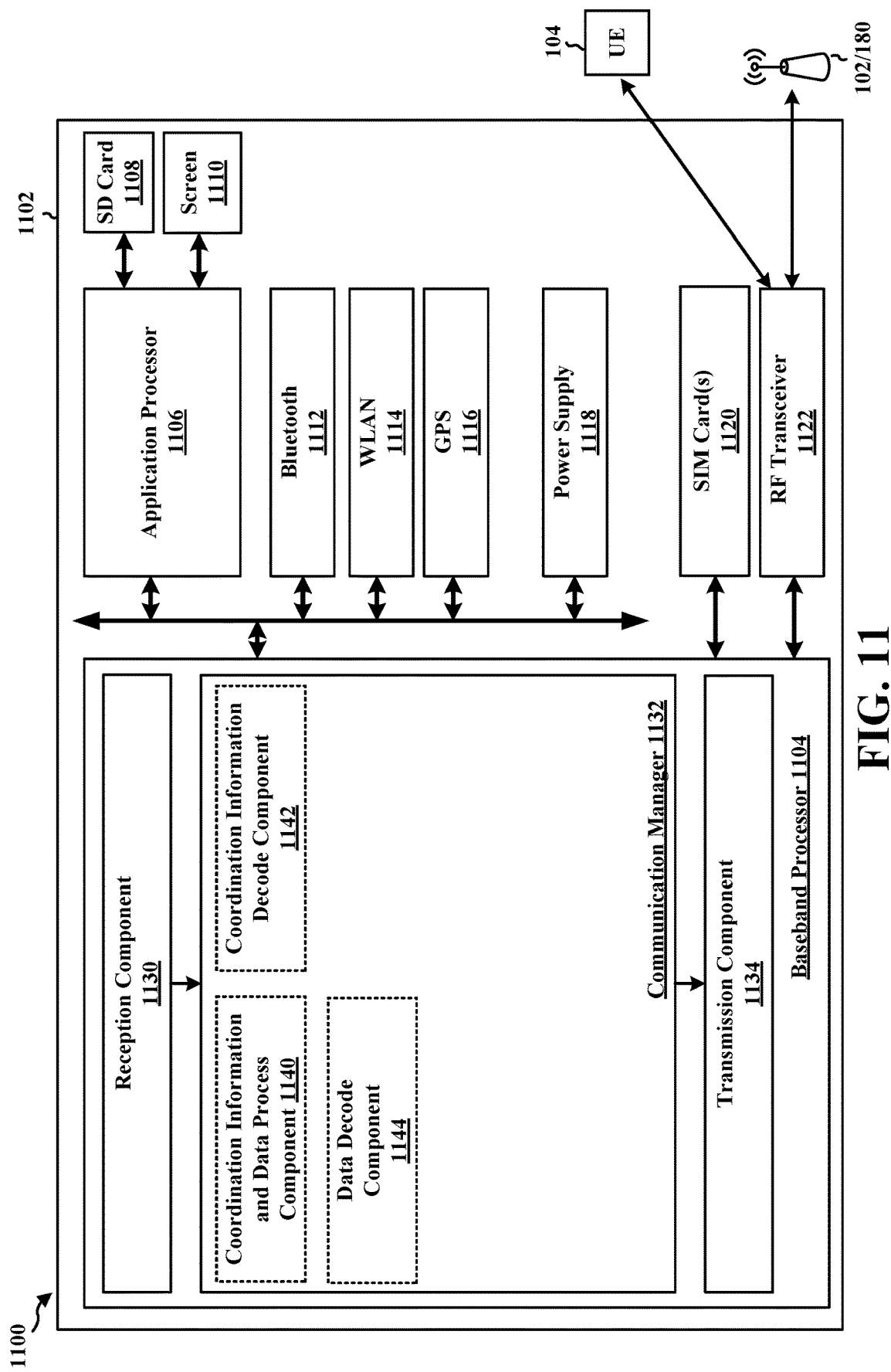
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 is a UE and includes a cellular baseband processor 1104 (also referred to as a modem) coupled to a RF transceiver 1122 and one or more subscriber identity modules (SIM) cards 1120, an application processor 1106 coupled to a secure digital (SD) card 1108. In some aspects, the baseband processor 1104 may be a cellular baseband processor, and the RF transceiver may be a cellular RF transceiver. The apparatus may further include a screen 1110, a Bluetooth module 1112, a wireless local area network (WLAN) module 1114, a Global Positioning System (GPS) module 1116, and/or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described herein. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see UE 350 of FIG. 3) and include the additional modules of the apparatus 1102.

The communication manager 1132 includes a coordination information and data process component 1140 that is configured to receive a first transmission on a PSSCH, the first transmission including a first transport block comprising coordination information for sidelink resources and a second transport block comprising data, e.g., as described in connection with 1002 of FIG. 10. The communication manager 1132 further includes a coordination information decode component 1142 that is configured to decode the coordination information for sidelink resources in the first transport block, e.g., as described in connection with 1004 of FIG. 10. The communication manager 1132 further includes a data decode component 1144 that is configured to decode the data in the second transport block, e.g., as described in connection with 1006 of FIG. 10.

The apparatus may include additional components that perform each of the block of the algorithm in the aforementioned flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for receiving a first transmission on a PSSCH, the first transmission including a first transport block comprising coordination information for sidelink resources and a second transport block comprising data (e.g., the coordination information and data process component 1140 and/or the reception component 1130). The apparatus 1102 includes means for decoding the coordination information for sidelink resources in the first transport block (e.g., the coordination information decode component 1142). The apparatus 1102 includes means for decoding the data in the second transport block (e.g., the data decode component 1144).

The aforementioned means may be one or more of the components of the apparatus 1102 configured to perform the functions recited by the aforementioned means. The apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

The following aspects are illustrative only and may be combined with other aspects or teachings described herein, without limitation.

Aspect 1 is a method of wireless communication at a transmitting device, comprising: encoding coordination information for sidelink resources in a first transport block; encoding data in a second transport block; and transmitting a first transmission on a PSSCH, the first transmission including the first transport block comprising the coordination information for the sidelink resources and the second transport block comprising the data.

In aspect 2, the method of aspect 1 further includes that the coordination information is included in a MAC-CE on the PSSCH.

In aspect 3, the method of aspect 1 or aspect 2 further comprises: transmitting a second transmission on the PSSCH, the second transmission comprising a third transport block including updated coordination information and a retransmission of the second transport block.

In aspect 4, the method of any of aspects 1-3 further includes that the first transport block and the second transport block are transmitted on different OFDM symbols of the first transmission.

In aspect 5, the method of any of aspects 1-4 further includes that the first transport block and the second transport block are transmitted on different physical resource blocks of the first transmission.

In aspect 6, the method of any of aspects 1-5 further comprises: mapping the first transport block to a first set of PRBs in a first set of OFDM resources and a second set of PRBs in a second set of OFDM symbols; and mapping the second transport block to the second set of PRBs in the first set of OFDM symbols and to the first set of PRBs in the second set of OFDM symbols.

In aspect 7, the method of any of aspects 1-6 further includes that the first transport block is transmitted on a first layer and the second transport block is transmitted on a second layer.

In aspect 8, the method of any of aspects 1-7 further includes that the first layer and the second layer are transmitted using orthogonal antenna ports.

In aspect 9, the method of any of aspects 1-8 further comprises: using a lower power to transmit the first transport block comprising the coordination information on the first layer than to transmit the second transport block comprising the data on the second layer.

In aspect 10, the method of any of aspects 1-9 further includes that the first transport block comprises coordination information that is transmitted using a lower code rate than the second transport block.

In aspect 11, the method of any of aspects 1-10 further comprises: transmitting SCI including an indication of a presence of the first layer.

In aspect 12, the method of any of aspects 1-11 further comprises: using non-orthogonal multiplexing to transmit the first transport block comprising the coordination information and the second transport block comprising the data.

In aspect 13, the method of any of aspects 1-12 further includes that the non-orthogonal multiplexing includes one or more of different spreading codes for the first transport block and the second transport block or power domain multiplexing.

In aspect 14, the method of any of aspects 1-13 further includes that the first transport block is encoded using a first constellation and the second transport block is encoded using a second, different constellation.

In aspect 15, the method of any of aspects 1-14 further comprises: transmitting SCI indicating resource reservation information for the transmitting device, where the coordination information is different than the resource reservation information.

In aspect 16, the method of any of aspects 1-15 further includes that the coordination information comprises one or more of: information about the sidelink resources reserved by one or more additional transmitting devices, information about the sidelink resources occupied by the one or more additional transmitting devices, a first indication of preferred sidelink resources for communication with the transmitting device, or a second indication of resources to avoid for the communication with the transmitting device.

In aspect 17, the method of any of aspects 1-16 further includes that the first transport block and the second transport block are separated based on both TDM and FDM in the first transmission.

Aspect 18 is an apparatus for wireless communication including at least one processor coupled to a memory and configured to implement a method as in any of aspects 1 to 17.

Aspect 19 is an apparatus for wireless communication including means for implementing a method as in any of aspects 1 to 17.

Aspect 20 is a non-transitory computer-readable medium storing computer executable code, where the code when executed by a processor causes the processor to implement a method as in any of aspects 1 to 17.

Aspect 21 is a method of wireless communication at a receiving device, comprising: receiving a first transmission on a PSSCH, the first transmission including a first transport block comprising coordination information for the sidelink resources and a second transport block comprising data; decoding the coordination information for sidelink resources in the first transport block; and decoding the data in the second transport block.

In aspect 22, the method of aspect 21 further comprises: using the coordination information to select resources for a sidelink transmission.

In aspect 23, the method of aspect 21 or aspect 22 further includes that the coordination information is received in a MAC-CE on the PSSCH.

In aspect 24, the method of any of aspects 20-23 further comprises: receiving a second transmission on the PSSCH, the second transmission comprising a third transport block including updated coordination information and a retransmission of the second transport block; and performing HARQ combining of the second transport block from the first transmission and the retransmission of the second transport block from the second transmission.

In aspect 25, the method of any of aspects 20-24 further includes that the first transport block and the second transport block are received on different OFDM symbols in the first transmission.

In aspect 26, the method of any of aspects 21-25 further includes that the first transport block and the second transport block are received on different physical resource blocks in the first transmission.

In aspect 27, the method of any of aspects 21-26 further includes that the first transport block is mapped to a first set of PRBs in a first set of OFDM resources and to a second set of PRBs in a second set of OFDM symbols, and where the second transport block is mapped to the second set of PRBs in the first set of OFDM symbols and to the first set of PRBs in the second set of OFDM symbols.

In aspect 28, the method of any of aspects 21-27 further includes that the first transport block is received on a first layer and the second transport block is received on a second layer.

In aspect 29, the method of any of aspects 21-28 further includes that the first layer and the second layer have orthogonal antenna ports.

In aspect 30, the method of any of aspects 21-29 further includes that the first transport block comprising the coordination information on the first layer is received with a lower transmission power than the second transport block comprising the data on the second layer.

In aspect 31, the method of any of aspects 21-30 further includes that the first transport block comprises the coordination information that is received using a lower code rate than the second transport block.

In aspect 32, the method of any of aspects 21-31 further comprises: receiving SCI including an indication of a presence of the first layer.

In aspect 33, the method of any of aspects 21-32 further includes that the first transport block comprising the coordination information is non-orthogonally multiplexed with the second transport block comprising the data.

In aspect 34, the method of any of aspects 21-33 further includes that non-orthogonal multiplexing of the first transport block and the second transport block include s applying one or more of different spreading codes for the first transport block and the second transport block or power domain multiplexing.

In aspect 35, the method of any of aspects 21-34 further comprises: canceling the second transport block from the first transmission to decode the coordination information in the first transport block.

In aspect 36, the method of any of aspects 21-35 further includes that the first transport block is encoded using a first constellation and the second transport block is encoded using a second constellation that is different than the first constellation.

In aspect 37, the method of any of aspects 21-36 further comprises: canceling the second transport block from the first transmission using the second constellation to decode the coordination information in the first transport block using the first constellation.

In aspect 38, the method of any of aspects 21-37 further comprises: receiving SCI indicating resource reservation information for a transmitting device, where the coordination information is different than the resource reservation information.

In aspect 39, the method of any of aspects 21-38 further includes that the coordination information comprises one or more of: information about the sidelink resources reserved by one or more additional transmitting devices, information about the sidelink resources occupied by the one or more additional transmitting devices, a first indication of preferred sidelink resources for communication with the transmitting device, or a second indication of resources to avoid for the communication with the transmitting device.

In aspect 40, the method of any of aspects 21-39 further includes that the first transport block and the second transport block are received based on TDM, FDM, or a combination of both TDM and FDM in the first transmission.

Aspect 41 is an apparatus for wireless communication including at least one processor coupled to a memory and configured to implement a method as in any of aspects 21 to 40.

Aspect 42 is an apparatus for wireless communication including means for implementing a method as in any of aspects 21 to 40.

Aspect 43 is a non-transitory computer-readable medium storing computer executable code, where the code when executed by a processor causes the processor to implement a method as in any of aspects 21 to 40.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a transmitting device, comprising:
    a memory; and
    at least one processor coupled to the memory and configured to:
        transmit sidelink control information (SCI) indicating a resource reservation for a first transmission on a physical sidelink shared channel (PSSCH);
        encode coordination information for sidelink resources in a first transport block, wherein the coordination information comprises one or more of: first information about the sidelink resources reserved by one or more additional transmitting devices, second information about the sidelink resources occupied by the one or more additional transmitting devices, a first indication of preferred sidelink resources for communication with the transmitting device, or a second indication of resources to avoid for the communication with the transmitting device;
        encode data in a second transport block; and
        transmit the first transmission on the PSSCH based on the resource reservation indicated in the SCI, the first transmission including the first transport block comprising the coordination information for the sidelink resources and the second transport block comprising the data.

2. The apparatus of claim 1, wherein the coordination information is included in a medium access control-control element (MAC-CE) on the PSSCH.

3. The apparatus of claim 1, wherein the at least one processor is further configured to:
    transmit a second transmission on the PSSCH, the second transmission comprising a third transport block including updated coordination information and a retransmission of the second transport block.

4. The apparatus of claim 1, wherein the first transport block and the second transport block are transmitted on different orthogonal frequency division multiplexing (OFDM) symbols of the first transmission.

5. The apparatus of claim 1, wherein the first transport block and the second transport block are transmitted on different physical resource blocks of the first transmission.

6. The apparatus of claim 1, wherein the first transport block and the second transport block are separated based on both time division multiplexing (TDM) and frequency division multiplexing (FDM) in the first transmission.

7. The apparatus of claim 1, wherein the first transport block is transmitted on a first layer and the second transport block is transmitted on a second layer.

8. The apparatus of claim 7, wherein the first layer and the second layer are transmitted using orthogonal antenna ports.

9. The apparatus of claim 7, wherein the at least one processor is further configured to:
    use a lower power to transmit the first transport block comprising the coordination information on the first layer than to transmit the second transport block comprising the data on the second layer.

10. The apparatus of claim 7, wherein the first transport block comprises the coordination information that is transmitted using a lower code rate than the second transport block.

11. The apparatus of claim 7, wherein the SCI includes an indication of a presence of the first layer.

12. The apparatus of claim 1, further comprising at least one transceiver coupled to the at least one processor, wherein the at least one processor is configured to transmit the first transmission via the at least one transceiver.

13. A method of wireless communication at a transmitting device, comprising:
    transmitting sidelink control information (SCI) indicating a resource reservation for a first transmission on a physical sidelink shared channel (PSSCH);
    encoding coordination information for sidelink resources in a first transport block, wherein the coordination information comprises one or more of: first information about the sidelink resources reserved by one or more additional transmitting devices, second information about the sidelink resources occupied by the one or more additional transmitting devices, a first indication of preferred sidelink resources for communication with the transmitting device, or a second indication of resources to avoid for the communication with the transmitting device;
    encoding data in a second transport block; and
    transmitting the first transmission on the PSSCH based on the resource reservation indicated in the SCI, the first transmission including the first transport block comprising the coordination information for the sidelink resources and the second transport block comprising the data.

14. The method of claim 13, wherein the coordination information is included in a medium access control-control element (MAC-CE) on the PSSCH.

15. The method of claim 13, further comprising:
    transmitting a second transmission on the PSSCH, the second transmission comprising a third transport block including updated coordination information and a retransmission of the second transport block.

16. The method of claim 13, wherein the first transport block and the second transport block are transmitted on different orthogonal frequency division multiplexing (OFDM) symbols of the first transmission.

17. The method of claim 13, wherein the first transport block and the second transport block are transmitted on different physical resource blocks of the first transmission.

18. The method of claim 13, further comprising:
mapping the first transport block to a first set of physical resource blocks (PRBs) in a first set of orthogonal frequency division multiplexing (OFDM) resources and a second set of PRBs in a second set of OFDM symbols, and
mapping the second transport block to the second set of PRBs in the first set of OFDM symbols and to the first set of PRBs in the second set of OFDM symbols.

19. The method of claim 13, wherein the first transport block is transmitted on a first layer and the second transport block is transmitted on a second layer.

20. The method of claim 19, wherein the first layer and the second layer are transmitted using orthogonal antenna ports.

21. The method of claim 19, further comprising:
using a lower power to transmit the first transport block comprising the coordination information on the first layer than to transmit the second transport block comprising the data on the second layer.

22. The method of claim 19, wherein the first transport block comprises the coordination information that is transmitted using a lower code rate than the second transport block.

23. The method of claim 19, wherein the SCI includes an indication of a presence of the first layer.

24. The method of claim 13, wherein the first transport block and the second transport block are separated based on both time division multiplexing (TDM) and frequency division multiplexing (FDM) in the first transmission.

25. An apparatus for wireless communication at a receiving device, comprising:
a memory; and
at least one processor coupled to the memory and configured to:
receive sidelink control information (SCI) indicating a resource reservation for a first transmission on a physical sidelink shared channel (PSSCH);
receive the first transmission on the PSSCH based on the resource reservation indicated in the SCI, the first transmission including a first transport block comprising coordination information for sidelink resources and a second transport block comprising data, wherein the coordination information comprises one or more of: first information about the sidelink resources reserved by one or more transmitting devices, second information about the sidelink resources occupied by the one or more transmitting devices, a first indication of preferred sidelink resources for communication with the one or more transmitting devices, or a second indication of resources to avoid for the communication with the one or more transmitting devices;
decode the coordination information for the sidelink resources in the first transport block; and
decode the data in the second transport block.

26. The apparatus of claim 25, wherein the at least one processor is further configured to:
receive a second transmission on the PSSCH, the second transmission comprising a third transport block including updated coordination information and a retransmission of the second transport block; and
perform hybrid automatic repeat request (HARD) combining of the second transport block from the first transmission and the retransmission of the second transport block from the second transmission.

27. The apparatus of claim 25, wherein the first transport block and the second transport block are received based on time division multiplexing (TDM), frequency division multiplexing (FDM), or a combination of both TDM and FDM in the first transmission.

28. A method of wireless communication at a receiving device, comprising:
receiving sidelink control information (SCI) indicating a resource reservation for a first transmission on a physical sidelink shared channel (PSSCH);
receiving the first transmission on the PSSCH based on the resource reservation indicated in the SCI, the first transmission including a first transport block comprising coordination information for sidelink resources and a second transport block comprising data, wherein the coordination information comprises one or more of: first information about the sidelink resources reserved by one or more transmitting devices, second information about the sidelink resources occupied by the one or more transmitting devices, a first indication of preferred sidelink resources for communication with the one or more transmitting devices, or a second indication of resources to avoid for the communication with the one or more transmitting devices;
decoding the coordination information for the sidelink resources in the first transport block; and
decoding the data in the second transport block.

29. The method of claim 28, further comprising:
receiving a second transmission on the PSSCH, the second transmission comprising a third transport block including updated coordination information and a retransmission of the second transport block; and
performing hybrid automatic repeat request (HARD) combining of the second transport block from the first transmission and the retransmission of the second transport block from the second transmission.

30. The method of claim 28, wherein the first transport block and the second transport block are received based on time division multiplexing (TDM), frequency division multiplexing (FDM), or a combination of both TDM and FDM in the first transmission.

\* \* \* \* \*